US012206603B2

United States Patent
He et al.

(10) Patent No.: US 12,206,603 B2
(45) Date of Patent: Jan. 21, 2025

(54) METHODS AND APPARATUS FOR MULTIPLE COMPONENT CARRIER PHYSICAL DOWNLINK SHARED CHANNEL SCHEDULING IN WIRELESS COMMUNICATION

(71) Applicant: Apple Inc., Cupertino, CA (US)

(72) Inventors: Hong He, Cupertino, CA (US); Dawei Zhang, Beijing (CN); Wei Zeng, Cupertino, CA (US); Chunhai Yao, Cupertino, CA (US); Haitong Sun, Cupertino, CA (US); Yuchul Kim, Cupertino, CA (US); Yushu Zhang, Cupertino, CA (US); Chunxuan Ye, Cupertino, CA (US); Oghenekome Oteri, Cupertino, CA (US); Weidong Yang, Cupertino, CA (US); Yang Tang, Cupertino, CA (US); Jie Cui, Cupertino, CA (US); Zhibin Wu, Cupertino, CA (US); Haijing Hu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 223 days.

(21) Appl. No.: 17/598,203

(22) PCT Filed: Feb. 12, 2020

(86) PCT No.: PCT/CN2020/074902
§ 371 (c)(1),
(2) Date: Sep. 24, 2021

(87) PCT Pub. No.: WO2021/159317
PCT Pub. Date: Aug. 19, 2021

(65) Prior Publication Data
US 2022/0376847 A1    Nov. 24, 2022

(51) Int. Cl.
*H04W 72/00* (2023.01)
*H04L 5/00* (2006.01)
(Continued)

(52) U.S. Cl.
CPC ......... *H04L 5/001* (2013.01); *H04W 72/0453* (2013.01); *H04W 72/23* (2023.01)

(58) Field of Classification Search
None
See application file for complete search history.

(56) References Cited

U.S. PATENT DOCUMENTS

| 2013/0039199 A1 | 2/2013 | Liao et al. |
| 2013/0063148 A1 | 3/2013 | Ma et al. |

(Continued)

FOREIGN PATENT DOCUMENTS

| CA | 2898546 A1 | 7/2014 |
| CN | 109560910 A | 4/2019 |

(Continued)

OTHER PUBLICATIONS

First Office Action for Chinese Application No. 202080096274.9, dated May 27, 2023, 14 pages.
(Continued)

*Primary Examiner* — Abdelillah Elmejjarmi
(74) *Attorney, Agent, or Firm* — WOMBLE BOND DICKINSON (US) LLP

(57) ABSTRACT

A method and apparatus of a device that determines a physical downlink shared channel scheduling resource for a user equipment device and a base station is described. In an exemplary embodiment, the device selects a plurality of component carriers from a pool of available component carriers associated with a wireless link established between the user equipment device and the base station. In addition, the device selects a virtual component carrier from the
(Continued)

plurality of component carriers. Furthermore, the device determines a physical downlink shared channel scheduling resource based on at least the virtual component carrier.

20 Claims, 17 Drawing Sheets

(51) Int. Cl.
*H04W 72/0453* (2023.01)
*H04W 72/23* (2023.01)

(56) References Cited

U.S. PATENT DOCUMENTS

| | | |
|---|---|---|
| 2014/0029584 A1 | 1/2014 | Qu et al. |
| 2014/0286299 A1 | 9/2014 | Ihm et al. |
| 2015/0365945 A1 | 12/2015 | Morioka et al. |
| 2016/0270063 A1 | 9/2016 | Chen et al. |
| 2016/0334534 A1 | 11/2016 | Cheng et al. |
| 2017/0181145 A1* | 6/2017 | Fong ............... H04W 12/106 |
| 2017/0251461 A1* | 8/2017 | Parkvall ............ H04L 5/0053 |
| 2018/0295608 A1 | 10/2018 | Nguyen et al. |
| 2018/0368165 A1* | 12/2018 | Martin ............... H04L 5/003 |
| 2019/0268129 A1* | 8/2019 | Lin .................... H04L 1/00 |
| 2020/0011295 A1 | 4/2020 | Gong et al. |
| 2020/0112959 A1* | 4/2020 | Gong ............... H04L 1/1822 |
| 2022/0209916 A1* | 6/2022 | Krishnamoorthy ... H04L 27/261 |
| 2022/0338221 A1* | 10/2022 | Muruganathan ......... H04L 5/14 |

FOREIGN PATENT DOCUMENTS

| | | |
|---|---|---|
| CN | 110574486 A | 12/2019 |
| JP | 2014-510479 B1 | 4/2014 |
| JP | 2016-027713 A | 2/2016 |
| JP | 2018-042000 A | 3/2018 |
| JP | 2018-508160 A | 3/2018 |
| JP | 2018-519721 A | 7/2018 |
| WO | 2014049325 A1 | 4/2014 |
| WO | 2016/188374 A1 | 12/2016 |
| WO | 2018/210205 A1 | 11/2018 |
| WO | 2019/047549 A1 | 3/2019 |

OTHER PUBLICATIONS

Office Action received for Indian Patent Application No. 202217044849, mailed on Oct. 11, 2023, 3 pages.
Notification to Grant Patent Right for Invention received for Chinese Patent Application No. 202080096274.9, mailed on Jan. 10, 2024, 3 pages (2 pages of English Translation and 1 page of Original Document).
Apple Inc., "Discussion on Enhancements to Scheduling/HARQ", 3GPP TSG RAN WG1 #99, R1-1912819, Nov. 18-22, 2019, 7 pages.
International Preliminary Report on Patentability received for PCT Patent Application No. PCT/CN2020/074902, mailed on Aug. 11, 2022, 4 pages.
International Search Report and Written Opinion received for PCT Patent Application No. PCT/CN2020/074902, mailed on Nov. 17, 2020, 6 pages.
Nokia et al., "On PDCCH Enhancements for NR URLLC", 3GPP TSG RAN WG1#99, R1-1912511, Nov. 18-22, 2019, 23 pages.
European Search Report and Search Opinion received for European Application No. 20918891.1, mailed on Aug. 22, 2023, 10 pages.
NEC, "On cross-carrier scheduling for CA beyond 5 CCs," 3gpp R1-151562, Apr. 20-24, 2015, pp. 5.
Office Action received for Japanese Patent Application No. 2022-548900, mailed on Sep. 4, 2023, 11 pages (5 pages of English Translation and 6 pages of Original Document).
Office Action received for Japanese Patent Application No. 2022-548900, mailed on Jun. 20, 2024, 6 pages (3 pages of English Translation and 3 pages of Original Document).

* cited by examiner

METHODS AND APPARATUS FOR MULTIPLE COMPONENT CARRIER PHYSICAL DOWNLINK SHARED CHANNEL SCHEDULING IN WIRELESS COMMUNICATION

RELATED APPLICATIONS

The present application is the national phase of International Application No. PCT/CN2021/074902, filed on Feb. 12, 2020 and the disclosure of which is hereby incorporated herein by reference in its entirety.

FIELD OF INVENTION

This invention relates generally to wireless technology and more particularly to scheduling multiple component carriers physical downlink shared channel in a wireless communication.

BACKGROUND OF THE INVENTION

In Rel-16 New Radio unlicensed spectrum (NR-U) of fifth generation wireless for digital cellular networks (5G), multi-time transmission interval (TTI) physical uplink shared channel (PUSCH) transmissions can be scheduled by a single downlink control information (DCI) format on a single CC that has been supported. This is done mainly to reduce the number of Listen-before-Talk (LBT) attempts to grab the shared channel and, thus, to improve the resource utilization efficiency by avoiding potential LBT failures. For Rel-17 NR-U enhancement WI, one of objectives is to further enhance the multi-TTI scheduling by extending it from single CC to multiple CC with the same motivation as in Rel-15, e.g. reducing number of LBTs across CCs for uplink (UL) grants transmission. In addition, multi-TTI scheduling across CCs is also listed as one of objectives for Rel-17 RAN2-led MR-DC/CA enhancement WI as well as RAN1-led DSS (Dynamic Spectrum Sharing) enhancement to reduce control signaling overhead generally for all carrier aggregation cases.

How to efficiently control the number of DCI format IEs and size in adaptation to the number of actually scheduled CCs/slots numbers while still avoiding the increasing number of blind decoding (BD) at user equipment (UE) side is one of design challenges to enable this feature in Rel-17, while taking into account CA in licensed and unlicensed band for NR-U, CA enhancement as well as DSS.

SUMMARY OF THE DESCRIPTION

A method and apparatus of a device that determines a physical downlink shared channel scheduling resource for a user equipment device and a base station is described. In an exemplary embodiment, the device selects a plurality of component carriers from a pool of available component carriers associated with a wireless link established between the user equipment device and the base station. In addition, the device selects a virtual component carrier from the plurality of component carriers. Furthermore, the device determines a physical downlink shared channel scheduling resource based on at least the virtual component carrier.

In a further embodiment, a non-transitory machine-readable medium having executable instructions to cause one or more processing units to perform a method to determine a physical downlink shared channel scheduling resource for a user equipment device and a base station is described. In this embodiment, the method selects a plurality of component carriers from a pool of available component carriers associated with a wireless link established between the user equipment device and the base station. In addition, the method forms a virtual component channel from the plurality of component carriers. Furthermore, the method determines a physical downlink shared channel scheduling resource based on at least the virtual component carrier.

In some other embodiments, the pool of available component carriers includes at least one component carrier from a licensed band and at least one component carrier from an unlicensed band. The method, additionally, groups the pool of available component carriers into a plurality of groups of component carriers and selects one of the plurality of groups of component carriers as the plurality of component carriers. The method further selects the one of the plurality of groups of component carriers using a higher layers signal.

In some embodiments, the method selects the one of the plurality of groups of component carriers is based on at least a Media Access Control (MAC) control element. In addition, the MAC control element can be identified by a MAC protocol data unit sub-header with a dedicated logical channel. The MAC control element can be either fixed size or multiple groups of data. In addition, the method can select the one of the plurality of groups of component carriers is based on at least a component carrier selection field that is transmitted to the user equipment device.

In a further embodiment, the method forms the virtual component carrier by aggregating bandwidth of the plurality of component carriers. The aggregating can use at least a frequency domain resource allocation field and the frequency domain resource allocation field is variably sized.

In some embodiments, a method to determine a physical downlink shared channel scheduling resource for a user equipment device and a base station is described. In some embodiments, the method selects a plurality of component carriers from a pool of available component carriers associated with a wireless link established between the user equipment device and the base station. In addition, the method forms a virtual component carrier from the plurality of component carriers. Furthermore, the method determines a physical downlink shared channel scheduling resource based on at least the virtual component carrier.

In some other embodiments, the pool of available component carriers includes at least one component carrier from a licensed band and at least one component carrier from an unlicensed band. The method, additionally, groups the pool of available component carriers into a plurality of groups of component carriers and selects one of the plurality of groups of component carriers as the plurality of component carriers. In a further embodiment, the method forms the virtual component carrier by aggregating bandwidth of the plurality of component carriers.

In some embodiments, a user equipment device that includes at least one antenna and one radio is described. The at least one radio is to perform cellular communications using a radio access technology that establishes a wireless link with a base station. The user equipment device further includes at least one or more processors are to select a plurality of component carriers from a pool of available component carriers associated with a wireless link established between the user equipment device and the base station, form a virtual component carrier from the plurality of component carriers, and determine a physical downlink shared channel scheduling resource based on at least the virtual component carrier. In addition, the pool of available component carriers includes at least one component carrier from a licensed band and at least one component carrier from an unlicensed band. Furthermore, the one or more processors select the plurality of component carriers by grouping the pool of available component carriers into a plurality of groups of component carriers and selecting one of the plurality of groups of component carriers as the plurality of component carriers.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

A method and apparatus of a device that determines a physical downlink shared channel scheduling resource for a user equipment device and a base station is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that determines a physical downlink shared channel scheduling resource for a user equipment device and a base station is described. In some embodiments, the device is a user equipment device that has a wireless link with a base station. In some embodiments, the wireless link is a fifth generation (5G) link. The device further groups and selects component carriers (CCs) from the wireless link and determines a virtual CC from the group of selected CCs. The device additionally can perform a physical downlink resource mapping based on an aggregate resource matching patterns of groups of CCs.

Figure 1:
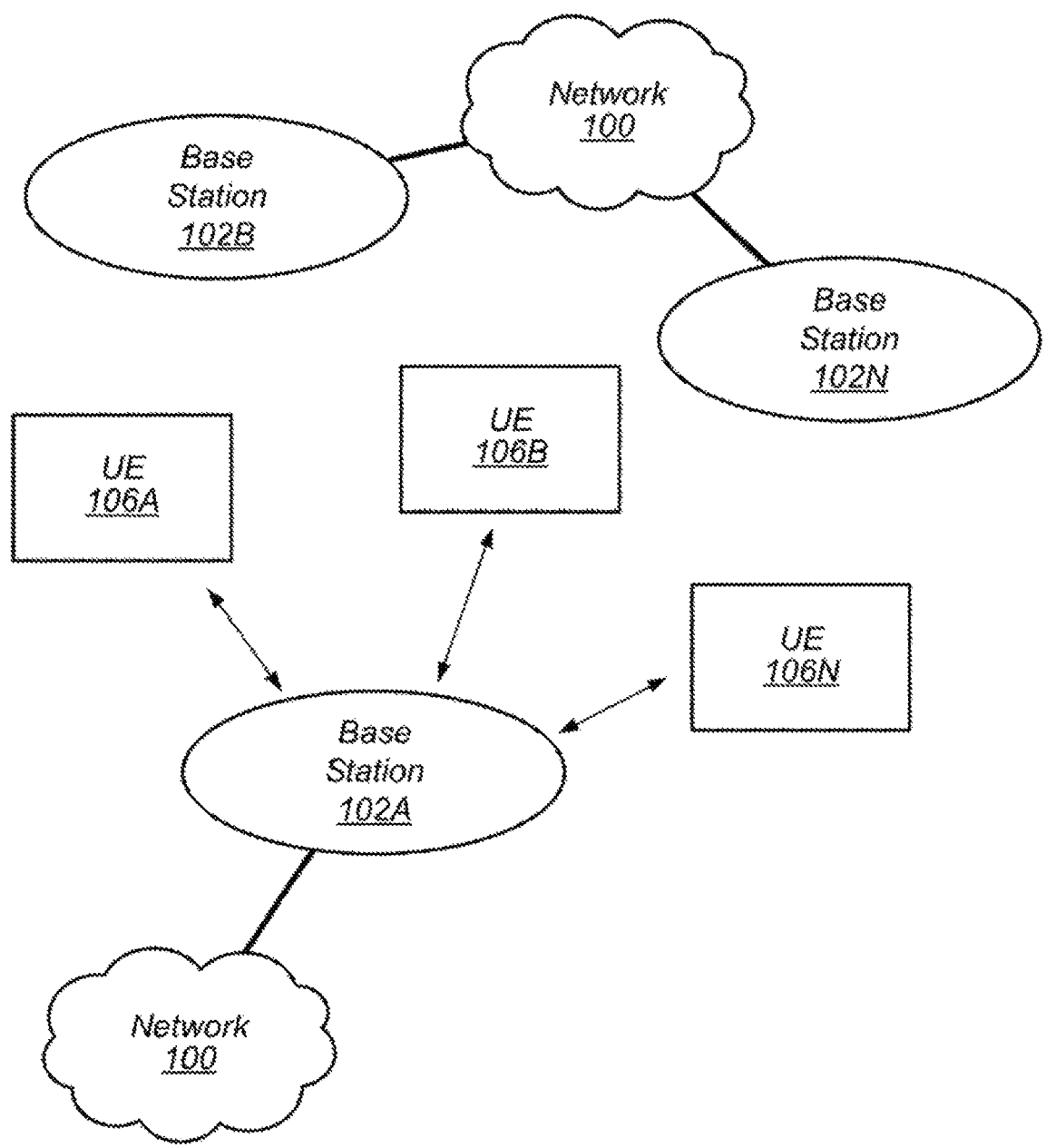
FIG. 1 illustrates an example wireless communication system according to some embodiments.

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UNITS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B ... 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
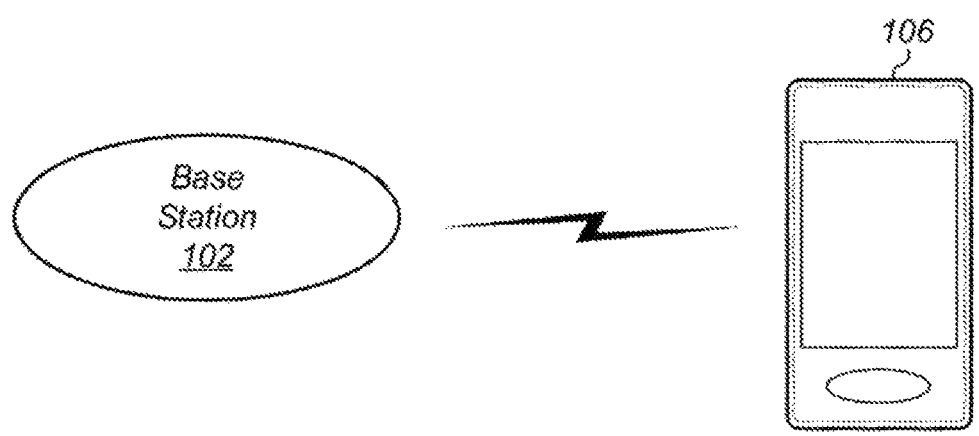
FIG. 2 illustrates a base station (BS) in communication with a user equipment (UE) device according to some embodiments.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
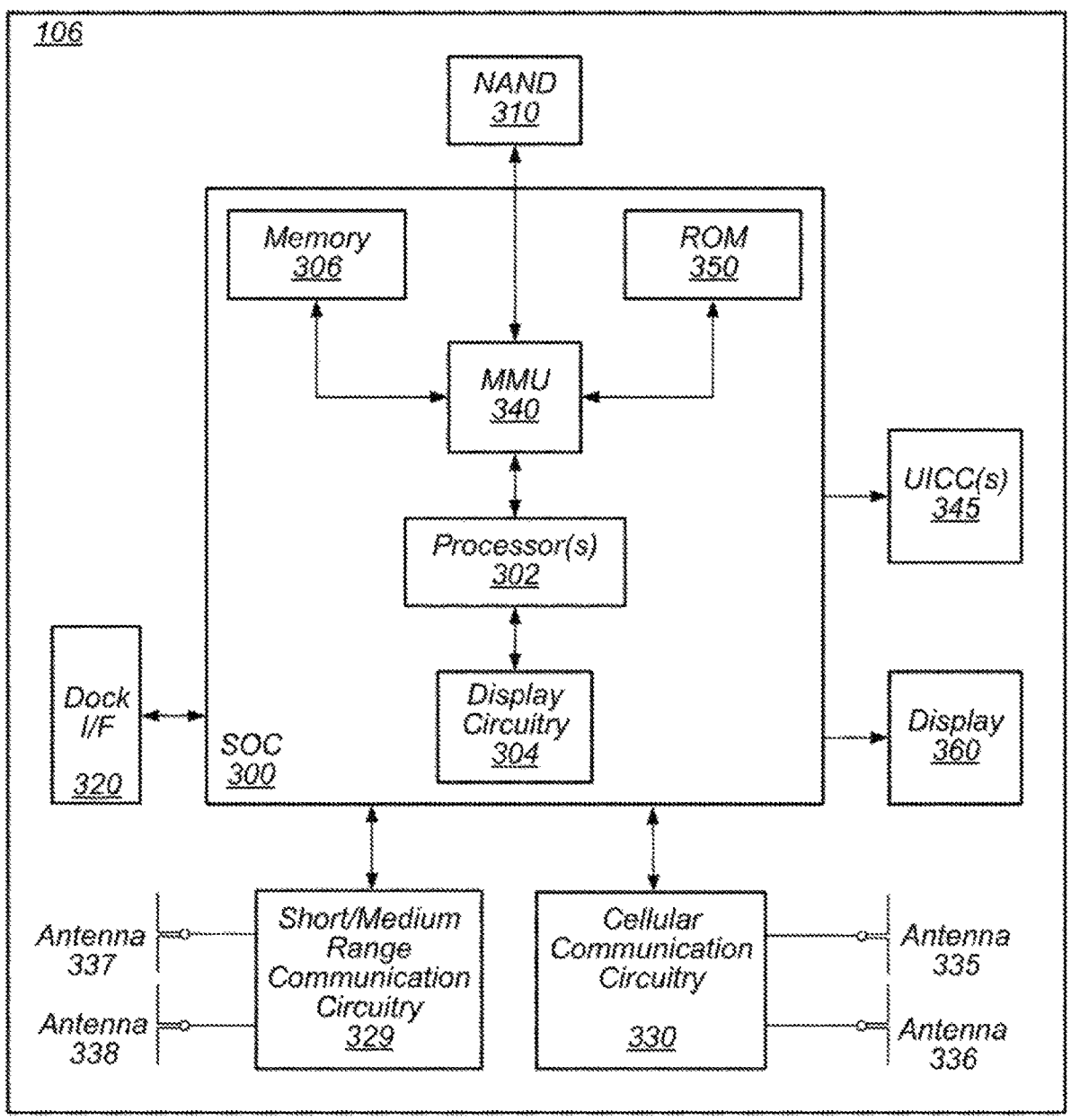
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
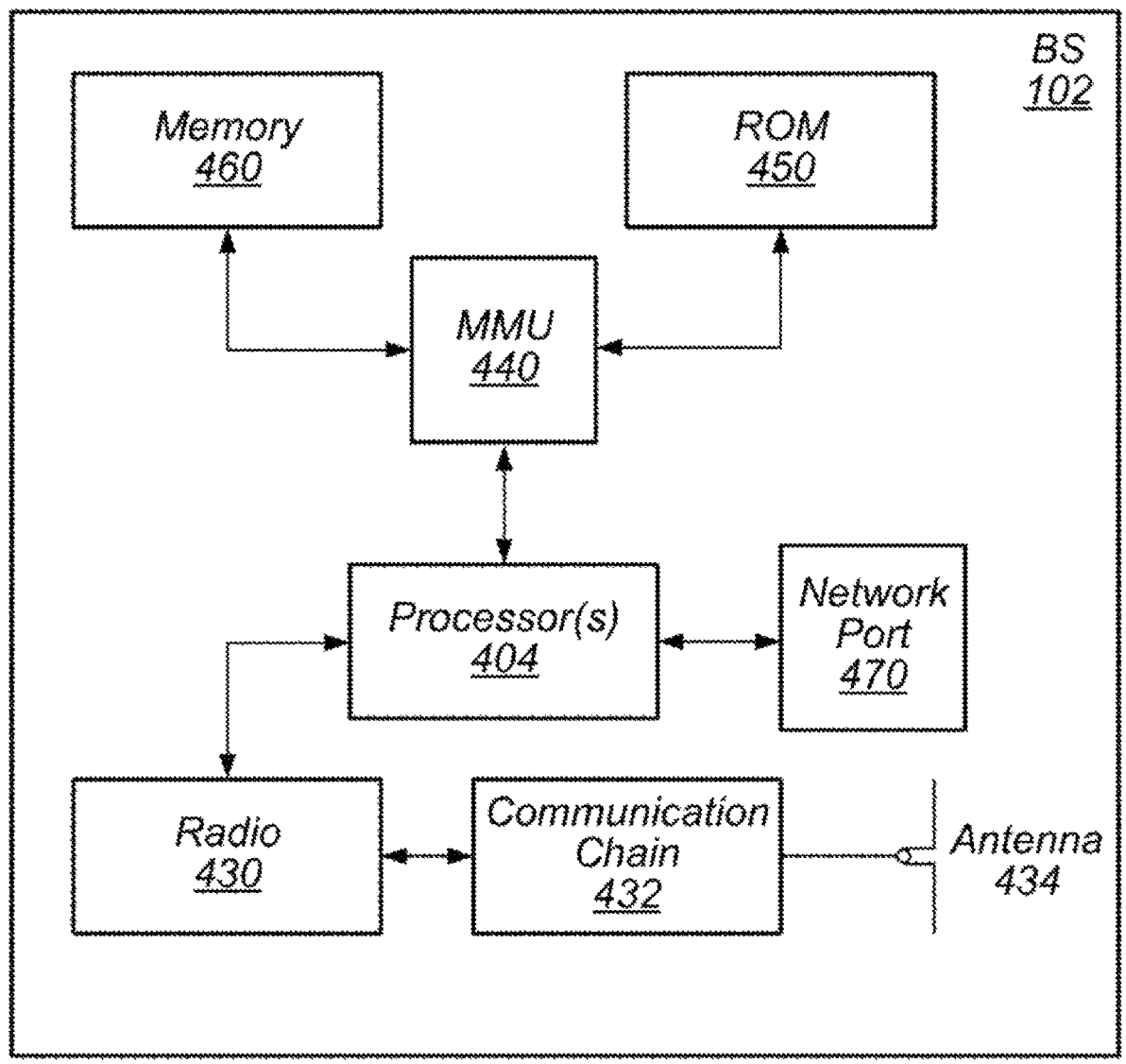
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
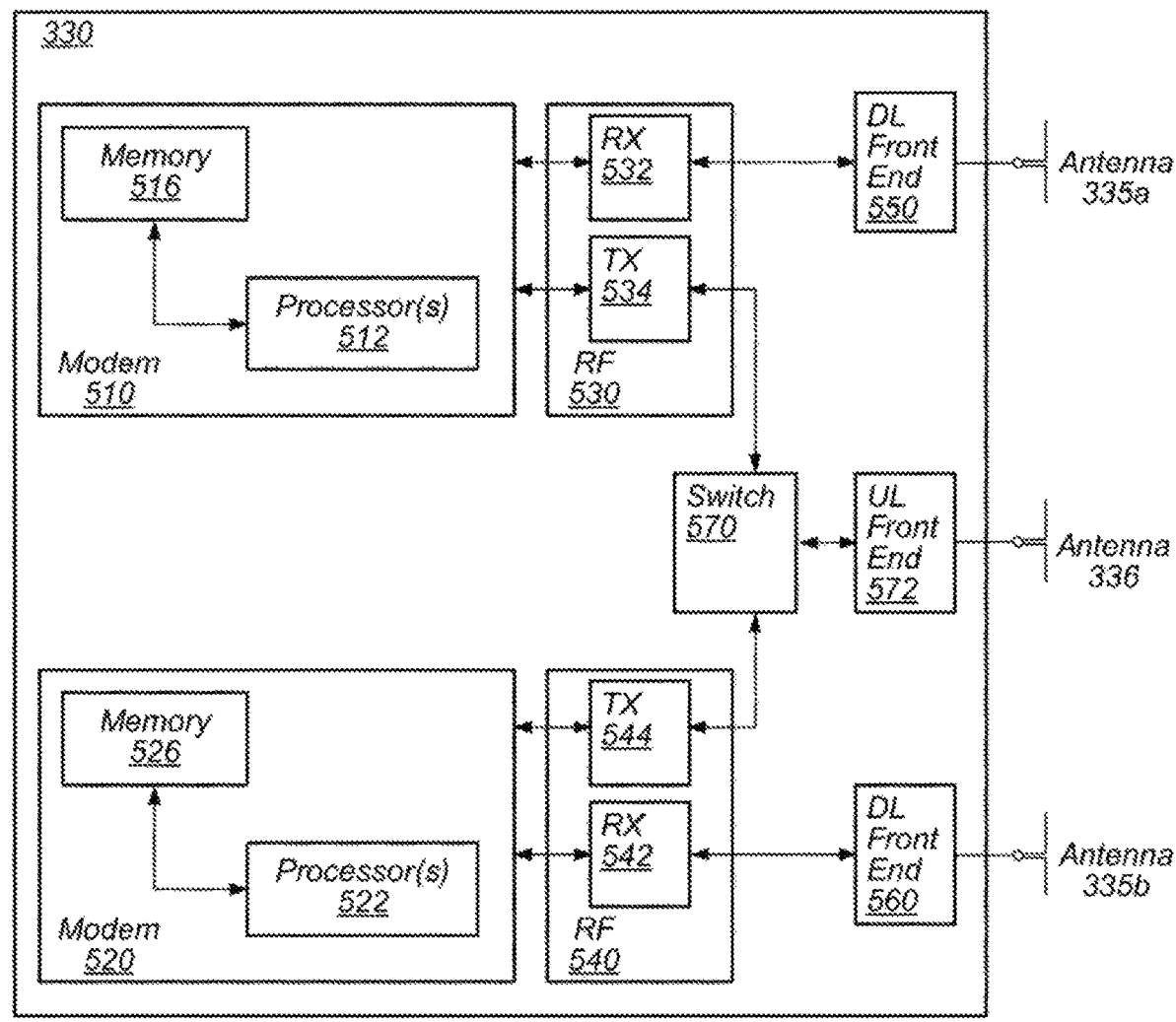
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for determining a physical downlink shared channel scheduling resource for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for determining a physical downlink shared channel scheduling resource for a user equipment device and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6:
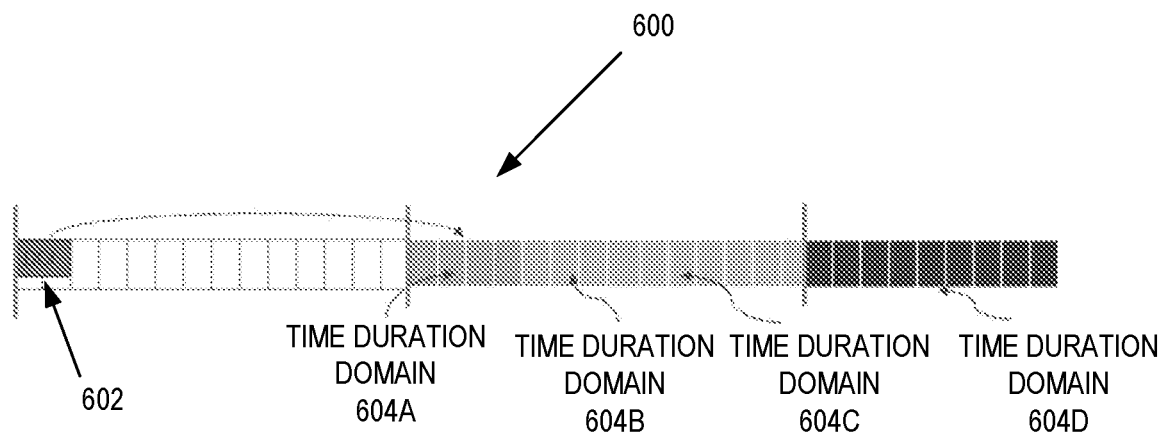
FIG. 6 is a block diagram of some embodiments of a Rel-16 TTI PUSCH scheduling.

FIG. 6 is a block diagram of some embodiments of a Rel-16 multi-time transmission interval (TTI) physical uplink shared channel (PUSCH) scheduling. In Rel-16 New Radio unlicensed spectrum (NR-U) of fifth generation wireless for digital cellular networks (5G), TTI PUSCH transmissions are scheduled by a single DCI format on a single component carrier (CC). This was motivated to reduce the number of Listen-before-Talk (LBT) attempts to grab the shared channel and, thus, improve the resource utilization efficiency by avoiding potential LBT failures. For Rel-17 NR-U enhancement WI, one of objectives is to further enhance the multi-TTI scheduling by extending this scheduling from a single CC to multiple CC with the same motivation as in Rel-15, e.g. by reducing the number of LBTs across CCs for uplink (UL) grants transmission from the user equipment to the base station. In addition, another challenge is use multi-TTI scheduling across CCs for Rel-17 Radio Access Network (RAN) working group 2-led MR-DC/CA enhancement WI as well as RAN1-led DSS (Dynamic Spectrum Sharing) enhancement to reduce control signaling overhead generally for all carrier aggregation cases. For example and in some embodiments, the multi-TTI PUSCH scheduling 600 includes a DCI 602 that references time duration domain 604A, which is followed by time duration domains 604B-D.

How to efficiently control the number of DCI format information elements (IEs) and size in adaptation to the number of actually scheduled CCs/slots numbers while still avoiding an increasing amount of blind decoding (BD) at the UE side is one of design challenges to enable this feature in Rel-17, while taking into account Carrier Aggregation (CA) in licensed and unlicensed bands for NR-U and/or CA enhancements as well as DSS.

Figure 7:
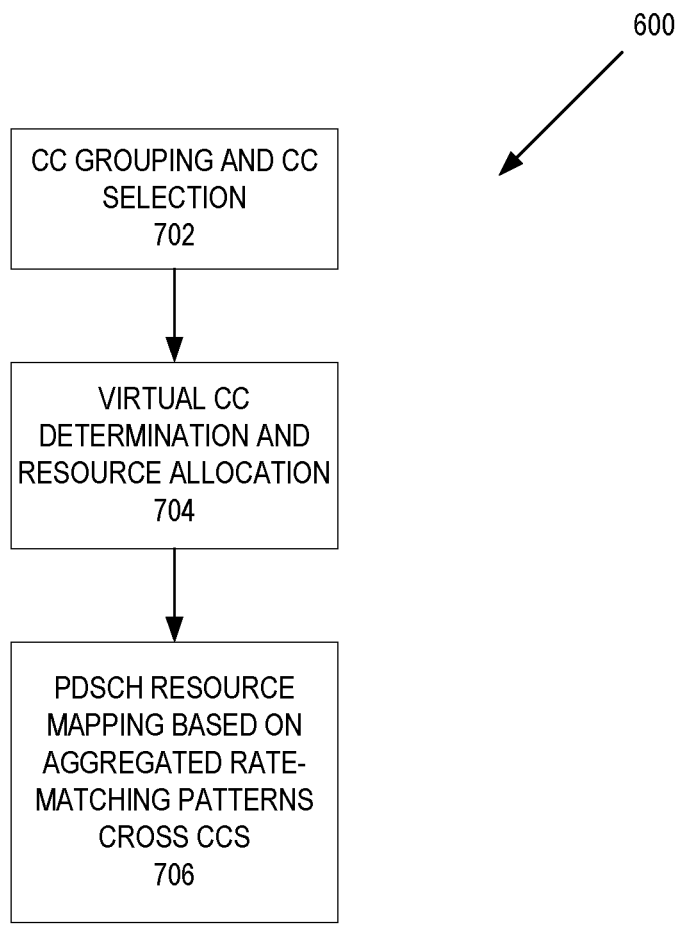
FIG. 7 is a flow diagram of some embodiments of a process to allocate resources of multiple CCs.

FIG. 7 is a flow diagram of some embodiments of a process 700 to allocate resources of multiple CCs. In some embodiments, in case of carrier aggregation (CA) on both licensed or unlicensed band, a UE may determine the physical downlink shared channel (PDSCH) scheduling and resource mapping across multiple CCs. At block 702, process 700 groups and selects the CCs to determine an 'effective' bandwidth that is indicated by downlink (DL) scheduling DCI format. In some embodiments, process 700 groups the CCs by higher layers signaling, Media Access Control (MAC) Control Element (CE), DCI format, or a combination of them. In a further embodiment, process 700 selects the CC group by a variety of schemes as described in FIGS. 8-10 below. At block 704, process 700 forms a virtual CC by aggregating the selected CCs in for resource allocation. In some embodiments, process 700 forms the virtual CC by aggregating the bandwidth of the N CCs signaled for resource allocation by a single frequency domain resource allocation (FDRA) field. The virtual CC formation is further described in FIG. 11 below. At block 706, process 700 determines the PDSCH resources based on the aggregated RE-level or RB-level resource mapping patterns of selected CCs. Determining the PDSCH is further described in FIG. 12 below.

Figure 8:
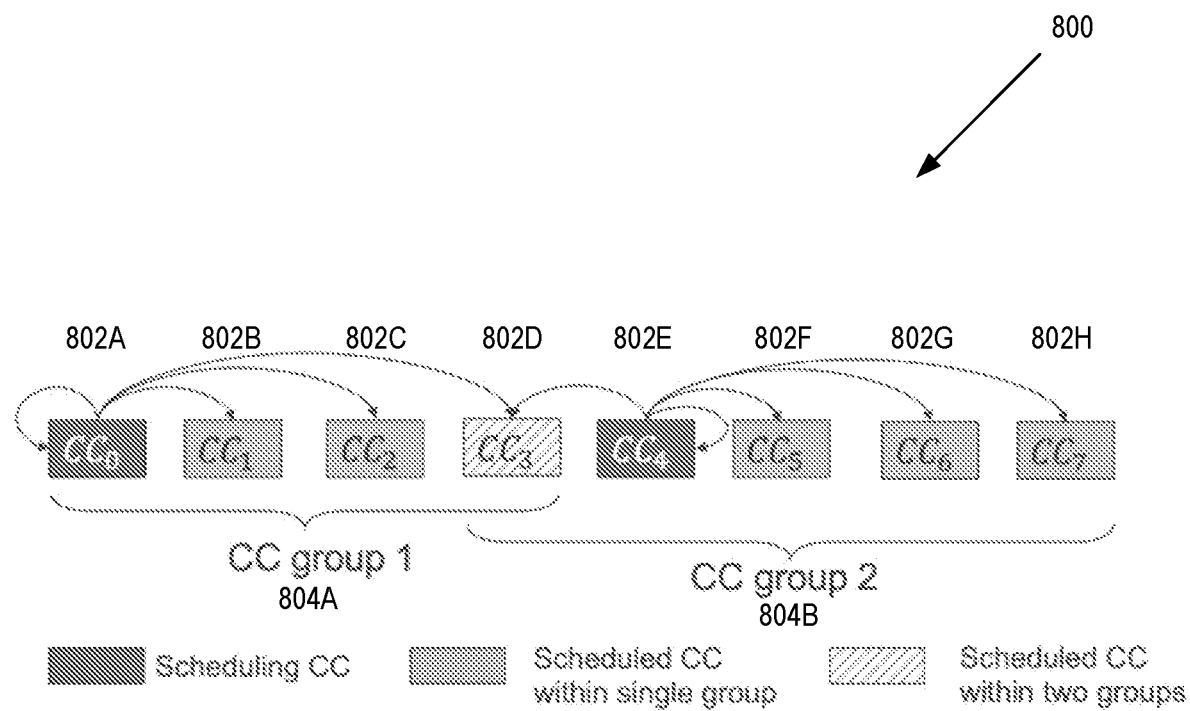
FIG. 8 is an illustration of some embodiments of a CC grouping operation.

FIG. 8 is an illustration of some embodiments of a CC grouping operation 800. In some embodiments, the configured CCs may be divided into different groups 804A-B. While in some embodiments, two CC groups are illustrated in FIG. 8, in alternate embodiment, there can be more or less numbers of CC groups. In some embodiments, each of the CC groups can include a scheduling CC, one or more CCs that are scheduled, and/or one or more CCs that are scheduled within two or more groups. For example and in some embodiments, in the CC group 804A includes the CC 802A that is the scheduling CC, CCs 802B-C that are scheduled in single group 804A, and the CC 802D, which is the CC that is scheduled within the group 804A and 804B. In a further example, the CCs within a CC group 804A (e.g. CC0~CC2 in group 1) are cross-carrier scheduled by a single CC (e.g. CC0 in FIG. 8). As mentioned above, in some embodiments, a single CC 802D may be grouped into two different groups 804A-B, which can be useful especially for unlicensed band to account for a LBT failure on one of scheduling CCs (e.g. CC 802A) but LBT succeeds on another scheduling CC (e.g. CC 802E) and scheduled CC (e.g. CC 802D). By grouping CC 802D into two CC groups 804A and 804B with essentially allowing scheduling DCI from two scheduling CC 802A and 802E, the PDSCH on CC 802D can be scheduled as long as one of these two scheduling CCs 802A and 802E passes LBT. While in some embodiments, each of the CC groups are illustrated with four CCs, in alternate embodiment, each of the CC groups can be have more or less numbers of CCs.

In some embodiments, the number of scheduled CC within a CC group by a single DCI format, denoting by S, may be limited to up to N, e.g. S<=N. In some embodiments, N=2. In addition, self-scheduling maybe assumed to other CCs in the group, e.g., the DCI that schedules PDSCH transmission on a CC is transmitted on the same CC. In some other embodiments, if a UE is configured with more than N CCs (e.g. LTE CCs for DSS case or NR unlicensed CCs, such as more than 4 CCs in FIG. 8), N CCs may be signaled for data scheduling in different ways with tradeoff between latency and DCI signaling overhead. In some embodiments, the N CCs may be selected by higher layer signals e.g. UE-dedicated radio-resource control (RRC) signaling. In this embodiment, this may be a good scheduling design for DSS operation on licensed band, which can achieve a desirable load balancing across CCs on a semi-static manner. However, this scheduling may not be feasible for NR-U operation simply because this scheduling may not be supported for fast CCs selection in adaption to dynamic LBT outcome.

Figure 9:
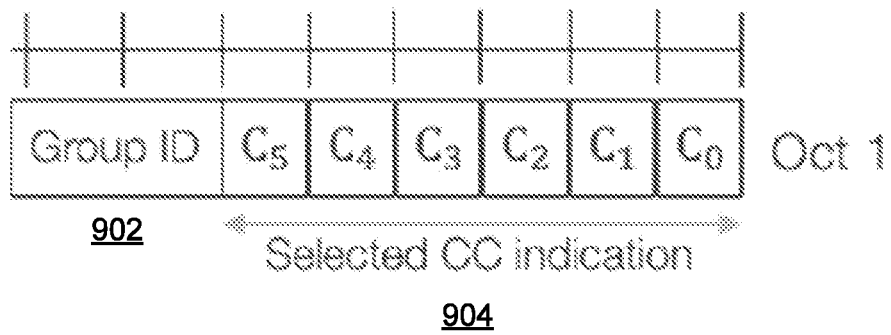
FIG. 9 is an illustration of some embodiments of a group-based CC selection and a UE-based CC selection.

FIG. 9 is an illustration of some embodiments of a group-based CC selection and a UE-based CC selection. In some embodiments, selecting N CCs for data scheduling can occur by selecting the CCs using a Media Access Control (MAC) Control Element, which is identified by a MAC protocol data unit (PDU) sub-header with a dedicated logic channel identifier (LCID). In some embodiments, two alternatives maybe considered on this direction: having a fixed size with one octet field; and (2) alternatively have more than one octet field size (e.g., up to four or more octets). In some embodiments, the MAC PDU 900 has a fixed size and consist of a single octet with following field as illustrated in FIG.9 with a group ID 902 that indicating the Group ID of the addressed CC group. In addition, the CCs selection indication 904 is a field that indicates the selected CCs indices S (S<=N) with each bit being associated with a CC within the indicated Group. Furthermore, the $C_i$ field in FIG. 9 (0≤i≤5) is set to "1" to indicate the SCell with the SCell index i is used for potential data scheduling where SCell is the secondary cell and SCell index is configured for each SCell by RRC signaling. It should be noted that i is numbered within each CC group and can be repeated across groups. In some embodiments, the $C_i$ field is set to "0."

In some other embodiments, MAC CE 906 may consist of up to four (or more/less) octets 908 to support CC switching for multiple CC groups at a cost of increased signaling overhead. In this embodiment, the UE may not expect more than N CCs to be selected for a given CC group.

Figure 10:
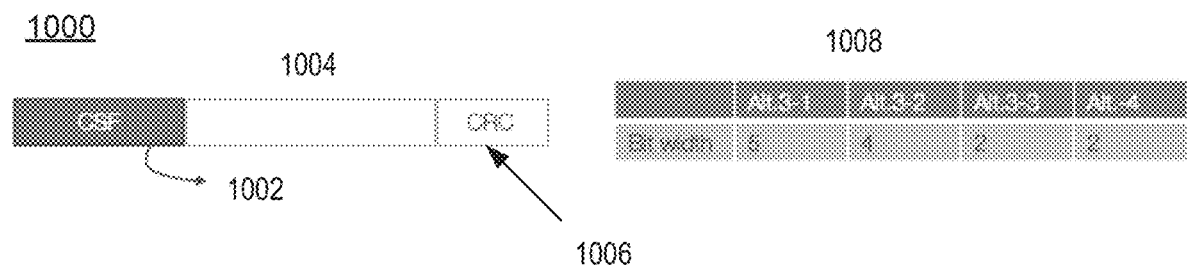
FIG. 10 is an illustration of some embodiments of a DCI format to indicate dynamically selected CCs.

FIG. 10 is an illustration of some embodiments of a DCI format 1000 to indicate dynamically selected CCs. In some embodiments, the CC Selection Field (CSF) 1002 may be transmitted in DCI format 1000 to signal the selected CCs indices for the scheduled DL and UL transmissions. In some embodiments, the CSF field 1002 consist of M bits 1008 and indicates the CCs that are selected for the data scheduling by a CC-level bitmap, wherein M denotes the CCs number within the respective group. The association between CIF value and CC index may be configured by RRC signaling. The number of bits used for the M bits depends on the method in which the bits are stored (1008).

In some other embodiments, the CSF field 1002 consists of $k=\log_2(_N^M)$ bits to signal binomial coefficient $(_N^M)$, wherein each bit indicates one index of N CCs selected from M CCs group. In a further embodiment, the N CCs maybe restricted to be continuous in frequency, e.g. to minimize RF bandwidth and hence save UE power as well as reducing signaling overhead. In this embodiment, the CSF field 1002 can indicate a starting CC index and consequently possibly reuse a Carrier Indicator Field (CIF) field defined in 5G NR DCI format. In some other embodiments, the CSF field 1002 indicates one row index that is associated with a set of CC indices that are configured by RRC signaling. In a further embodiment, the DCI format can include one or more other fields 1004 and/or a CRC field 1006.

Figure 11:
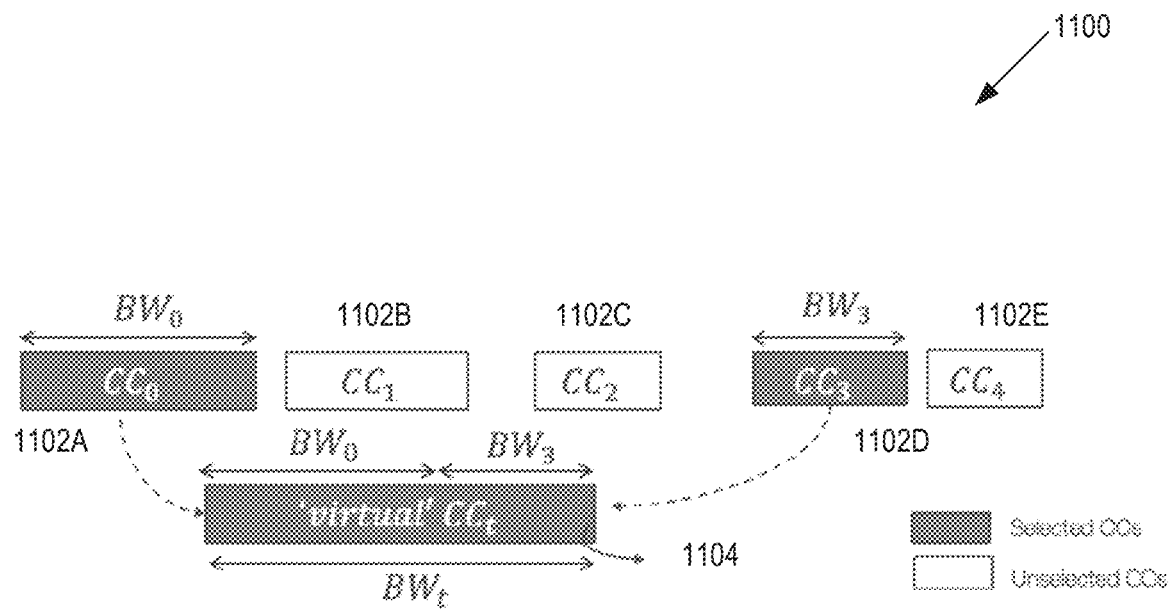
FIG. 11 is an illustration of some embodiments of CCs aggregation for frequency domain resource allocation (FDRA) determination.

FIG. 11 is an illustration of some embodiments of CC aggregation 1100 for frequency domain resource allocation (FDRA) determination. A virtual CC 1104 may be formed by aggregating the bandwidth of at most N CCs signaled in block 704 of FIG. 7 above for resource allocation by a single frequency domain resource allocation (FDRA) field, as illustrated in FIG. 11. For example and in some embodiments, CCs 1102A and 1102D out of CCs 1102A-E are aggregated into the virtual CCt 1104. The other CCs can be available for another virtual CC. The number of bits is determined by the aggregated virtual CCt 1104 and resource allocation type as follows:

$[\log_2((BW_t(BW_t+1))/2)]$bits, if only resource allocation 0 is configured $\max([\log_2((BW_t(BW_t+1))/2)], BW_t/P)+1$ bits if both $RA0$ and $RA1$ is configured $P$: RBG (RBG group Size)

In some embodiments, the P for virtual $CC_t$ 1104 maybe configured by RRC signaling or alternatively determined at least based $P_{CC0}$ and $P_{CC3}$ to maximize the resource utilization. In some embodiments, $P_{CCt}=\min(P_{CC0}, P_{CC3})$ and P represents the size of Resource Block Group (RBG).

Figure 12:
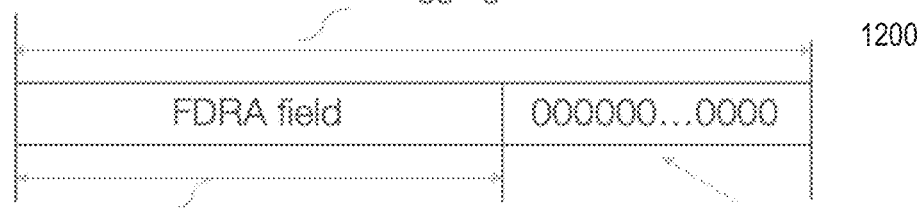
FIG. 12 is an illustration of some embodiments of a FDRA size determination for DCI-based approach.

FIG. 12 is an illustration of some embodiments of a FDRA size determination 1202 for DCI-based approach 1200. In some embodiments, one potential issue of this proposed solution is that it results in a variable FDRA size since this size determination is dependent on the selected CCs within a group. For example and in some embodiments, consider that $BW_0=100$ PRBs (Physical Resource Block, PRB), $BW_1=50$, and $BW_2=25$. In this example, the effective visual BW of aggregated $CC_t$ would be $BW_t=150$ PRBs in case of $CC_0/CC_1$ are selected, while $BW_t=125$ PRBs in case of $CC_0/CC_2$ are selected. This may lead to increased blind decoding attempts by the UE to hypothetically check for different DCI format size candidates. In some embodiments, certain solutions are designed to address this problem: (1) The number of bits for the FDRA field 1202 is determined assuming two CCs with largest aggregated bandwidth are selected; or (2) encoding the CSF field separately using an FEC scheme. In some embodiments, and referring to the $BW_t=150$ example above, the PRBs will be assumed for FDRA field size determination. If the number of actual FDRA bits in a DCI format is less than the reserved FDRA field size, e.g. $CC_1/CC_2$ are selected for a transmission occasion with effective $BW_t=75$ PRBs, zeros 1204 shall be appended to the actual FDRA IE until the payload size equals reserved size.

Figure 13:
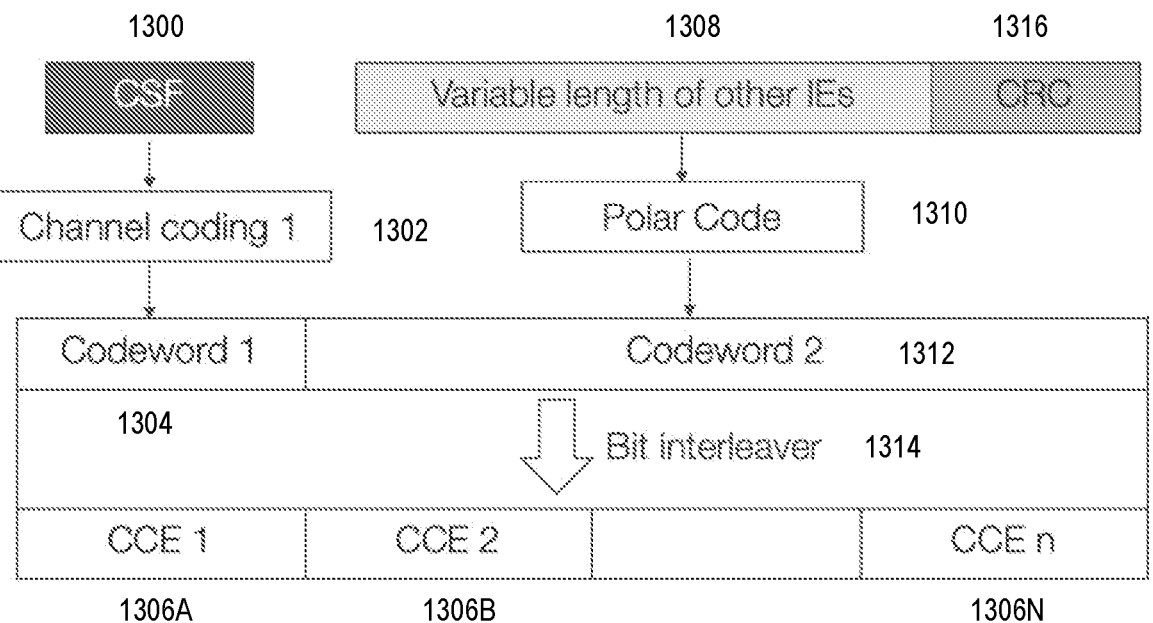
FIG. 13 is an illustration of some embodiments of separately encoding CSF field and other dependent IEs.

FIG. 13 is an illustration of some embodiments of separately encoding the CSF field 1300 and other dependent IEs 1308 into a set of CCEs 1306A-N. In some embodiments, to address the variable FDRA size, the CSF field 1300 can be separately encoded by an FEC scheme, which has both error-correction and error-detection capabilities. For example and in some embodiments, the CSF field 1300 can be encoded using a simplex code with repetition that is used in LTE for Physical Control Format Indicator Channel (PCFICH). The other fields that are used for the encoding can depends on the value of CSF field and can be encoded using polar code 1310 as in legacy. Compared to the previous solution described above in FIG. 12, this approach avoids zero padding operation. In order to leverage frequency diversity gain, the bit interleaved may be used to interleave the encoded CSF 1300 with other DCI bits and transmitted over all CCEs, as illustrated in FIG. 13. In some embodiments, The CSF 1300 is encoded using channel coding 1 (1302) to generate the codeword 1 (1304). The variable length of other IEs is encoded using the polar code 1310 to generate the codeword 2 (1312). In some embodiments, with a bit interleaver 1314, the CCEs 1306A-N are generated.

Figure 14:
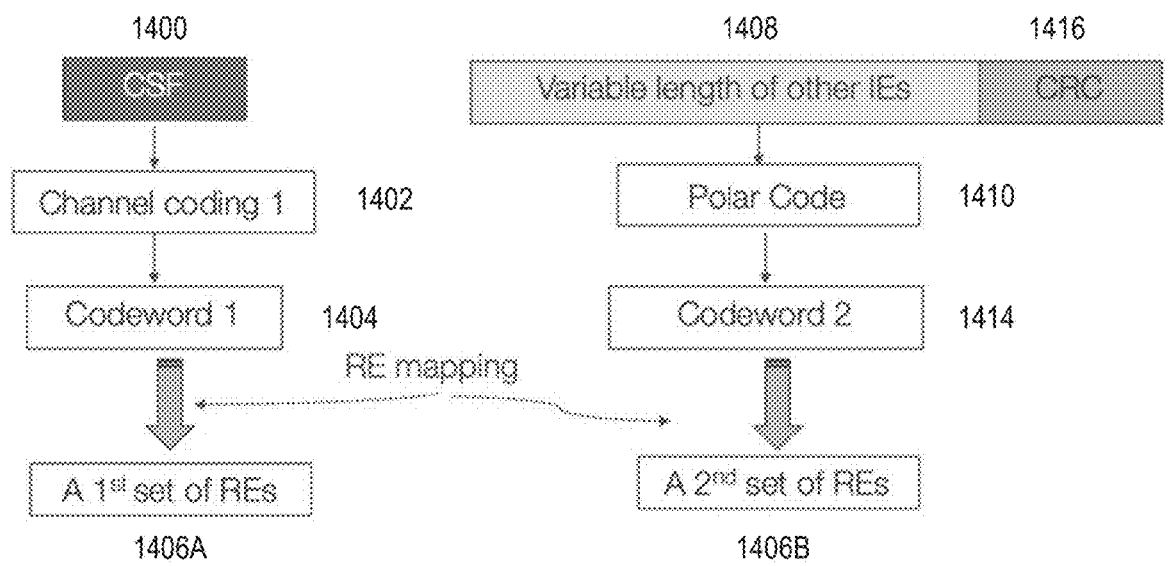
FIG. 14 is an illustration of some embodiments of separately encoding CSF field and other dependent IEs and separate re-mappings.

FIG. 14 is an illustration of some embodiments of separately encoding the CSF field 1400 and other dependent IEs and separate re-mappings. In some other designs, as depicted in FIG. 14, the encoded codeword 1 (1404) and codeword 2 (1414) can be mapped to separate RE sets (e.g., 1406A-B, respectively). In this embodiment, the CSF 1400 is encoded with the channel coding 1 (1402) to generate the codeword 1 (1404). The variable length of other IEs 1408 is encoded using the polar code to generate the codeword 2 (1414). In addition, a separate CRC field 1416 may be attached for CSF field 1400. To minimize the signaling overhead, the CRC length for CSF field may be kept as short, e.g. 4-bit or 8-bits.

Figure 15:
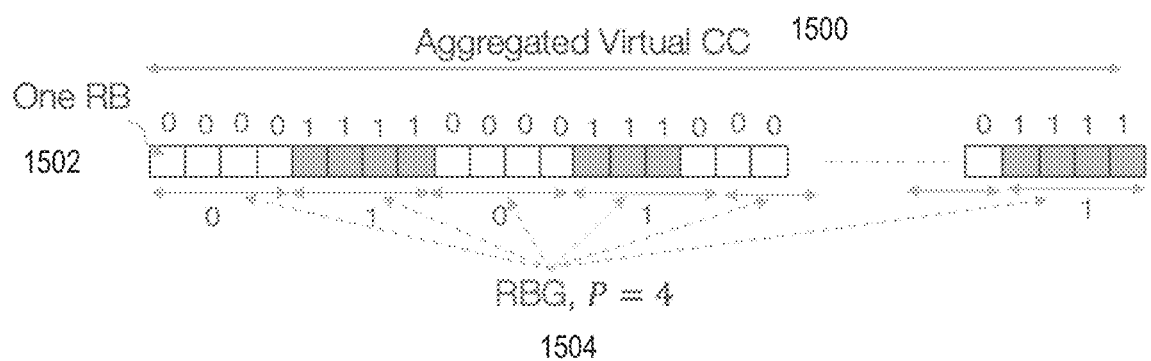
FIG. 15 is an illustration of some embodiments of RBG-based rate-matching pattern for resource allocation across aggregated virtual CC by a single FDRA field.

FIG. 15 is an illustration of some embodiments of RBG-based rate-matching pattern 1504 for resource allocation across aggregated virtual CC 1500 by a single FDRA field. In block 706 of FIG. 7, the UE can be configured with rateMatchingPattern by higher layers (e.g. RRC signaling, and/or another type of signaling or mechanism), which indicates which of the RBs/REs are available or not available for PDSCH transmission. In some embodiments, to reduce the signaling overhead, the pair of reserved resources may be indicated by an RBG granularity and a symbol level. In this embodiment, the size of RBG can be configured by RRC signaling or implicitly based on the minimum value of RBG associated with the signaled CCs (e.g. CC0 and CC3 in FIG. 10). In addition, and in some other embodiments, the LTE CRS rate-matching patterns configured for the selected CCs are aggregated and UE shall assume the REs indicated by this aggregated patterns are not available for PDSCH transmission.

In some embodiments, the DCI format size can be determined based on the bandwidth of RRC configured or MAC-CE selected CC, instead of a function of dynamically scheduled CCs for data transmission. In some other embodiments, some IEs are separate for different CCs, but other information fields can be shared in a joint grant. In some embodiments, the frequency domain resource allocation can be separate for different CCs, where the resource allocation granularity in a joint grant may be increased. In some embodiments, a scaling factor may be configured by higher layers on a per CC basis. More specifically, separate scaling factors may be configured for different resource allocation schemes, e.g., K1 is configured for type 1 and K2 is configured for Type-2, or, even scaling factor to be configured for a single resource allocation type only. For example, for a 20 MHz system, a scaling factor K1=2 maybe configured and correspondingly, the RBG size is increased from 16 RBs to 32 RBs in case of configuration 2 to decease the signaling overhead.

In some embodiments, some IEs are separate for different CCs. In more details, the New Data Indictor (NDI) IE is separately signaled for each Transport Block (TB) of each CC. In addition, the number of TBs for each CC is separately configured on a per CC basis. In some embodiments, some other IEs are commonly shared across CCs within a group. For example and in some embodiments, a Redundancy Version (RV) IE can be either shared for the CCs to control signaling overhead or 1-bit per scheduled CC. Alternatively there can be two RVs for a group of CCs or one RV for initial transmission of CCs and another RV for retransmission CCs.

In some embodiments, some IEs are separate for different CCs, but other information fields may be shared in a joint grant. A shared MCS for a set of CCs or all of CCs within a group may be indicated by higher layers signaling, e.g. depending on the frequency location of CCs. In addition, for CCs with a shared MCS, two MCS maybe present in a single grant, one for initial transmission and the other is for retransmission so as to provide flexible link adaptation. In a further embodiment, a time-domain resource allocation (TDRA) includes where a shared TDRA field may be present in a joint grant. In some other embodiments, a TDRA per CC may be included. In case of a shared TDRA IE, the UE can conduct resource mapping in accordance with the rate-matching patterns signaled for all CCs.

In some other embodiments, the number of blind decoding and aggregation levels can be further limited for monitoring joint DCI format due to the increased size. For example and in some embodiments, a larger aggregation level, e.g., AL-4/8/16 can be configurable for a joint grant.

Figure 16:
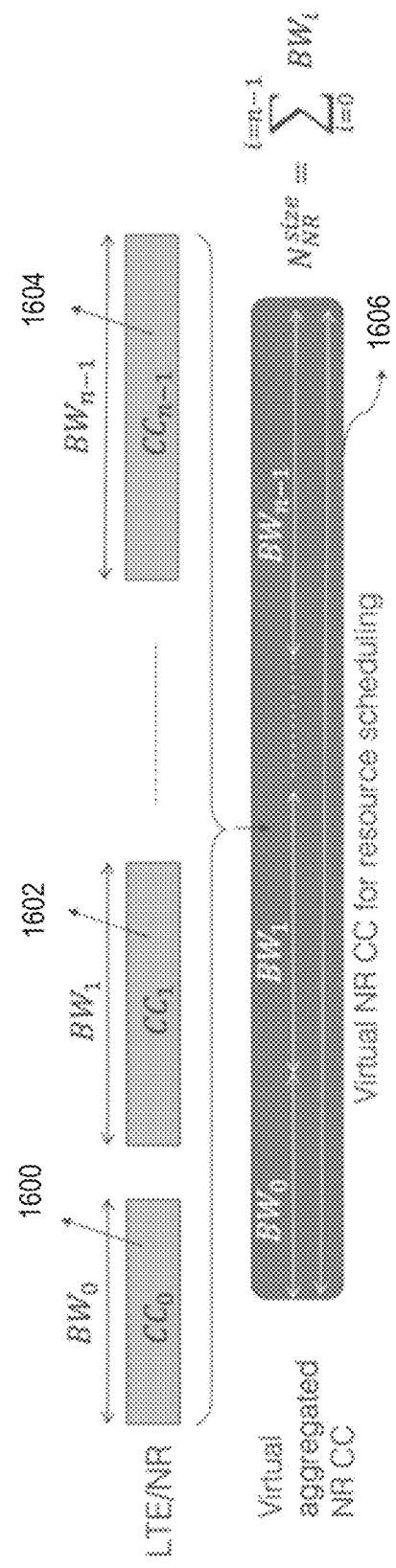
FIG. 16 is an illustration of some embodiments of a support multiple CRS rate-matching pattern for a single NR CC.

FIG. 16 is an illustration of some embodiments of a support multiple CRS (Cell-specific Reference Signal) rate-matching pattern for a single NR CC. In some embodiments, the Resource Elements (REs) corresponding to the indicated rate-matching pattern are not available for PDSCH transmission. In some embodiments, the UE can be configured with a LTE-CRS-RateMatch-PatternToAddModList given by ServingCellConfig or ServingCellConfigCommon. Each list can be configured with up to M CRS-RateMatchPatterns per NR serving cell 1606. Each RateMatchPattern may consist of combination of following informations to facilitate determination of CRS location of a single LTE $CC_i$ 1600/1602/1604 as shown in FIG.16 and correspondingly to allow UE figure out the REs that are not available for PDSCH transmission due to CRS transmissions:

V-shift value, which indicates value to rate-matching around the CRS.

nrofCRS-Ports, which indicates number of LTE CRS antenna ports for rate-matching.

CarrierFreqDL, relative to the Point A of NR serving cell, which indicates the center of the LTE carrier.

CarrierBandwidthDL, which indicates a $BW_i$ signaling the bandwidth of CC.

Figure 17:
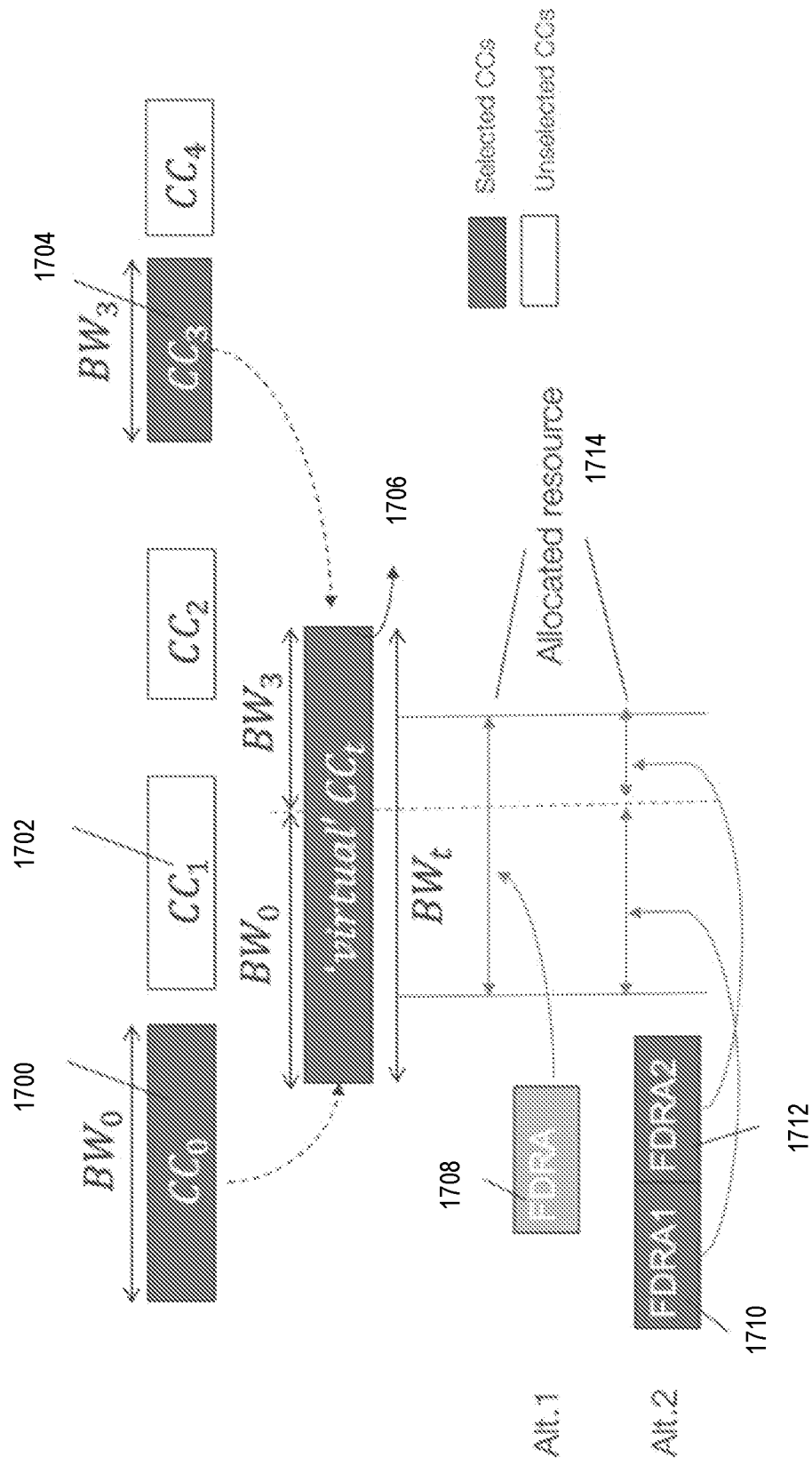
FIG. 17 is an illustration of some embodiments of resource allocation for a single-CC based operation.

FIG. 17 is an illustration of some embodiments of resource allocation for a single-CC based operation. In addition, a virtual NR CC 1706 with bandwidth $N_{NR}^{size}$ is formed by aggregating the bandwidth of L CCs for resource block assignment purpose, as illustrated in FIG.17. In some embodiments, CC 1700 and CC 1704 are aggregated into a virtual CC 1706. A variety of solutions can be considered for resource allocation in frequency domain across CCs 1700-1704: (1) A single Frequency Domain Resource Assignment (FDRA) 1708 is determined based on the virtual NR CC bandwidth 1706 and allocate resources 1714 across CCs 1700-1704. In some embodiments, a UE does not expect that the allocated PDSCH resources are located over more than N CCs. In some embodiments, the value of N can be hard encoded in specification, e.g. N=2. In some other embodiments, separate FDRA fields 1710-1712 are included in DCI format with one-to-one association with the scheduled CC. In this embodiment, the resource allocation granularity may be increased for each CC. In some designs, a scaling factor may be configured by higher layers on a per CC basis.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to determine a physical downlink shared channel scheduling resource for a user equipment device and a base station, the method comprising:
grouping a plurality of component carriers from a pool of available component carriers associated with a wireless link established between the user equipment device and the base station into a plurality of groups of component carriers, wherein at least one of the plurality of component carriers is included in two of the plurality of groups of component carriers;
selecting a group of component carriers among the plurality of groups of component carriers;
forming a virtual component carrier from the selected group of the component carriers; and
determining a physical downlink shared channel scheduling resource based on at least the virtual component carrier.

2. The non-transitory machine-readable medium of claim 1, wherein the pool of available component carriers includes at least one component carrier from a licensed band and at least one component carrier from an unlicensed band.

3. The non-transitory machine-readable medium of claim 1, wherein each group of the plurality of groups of component carriers comprises a scheduling component carrier.

4. The non-transitory machine-readable medium of claim 3, wherein the selecting the one of the plurality of groups of component carriers comprises:
selecting a group of component carriers that using at least a higher layers signal.

5. The non-transitory machine-readable medium of claim 3, wherein the selecting the one of the plurality of groups of component carriers is based on at least a Media Access Control (MAC) control element.

6. The non-transitory machine-readable medium of claim 5, wherein the MAC control element is identified by a MAC protocol data unit sub-header with a dedicated logical channel.

7. The non-transitory machine-readable medium of claim 6, wherein the MAC control element is a fixed size.

8. The non-transitory machine-readable medium of claim 6, wherein the MAC control element includes multiple groups of data.

9. The non-transitory machine-readable medium of claim 3, wherein the selecting the one of the plurality of groups of component carriers is based on at least a component carrier selection field that is transmitted to the user equipment device.

10. The non-transitory machine-readable medium of claim 1, wherein the forming of the virtual component carrier comprises:
aggregating bandwidth of the plurality of component carriers.

11. The non-transitory machine-readable medium of claim 10, wherein the aggregating using at least a frequency domain resource allocation field.

12. The non-transitory machine-readable medium of claim 11, wherein the frequency domain resource allocation field is variably sized.

13. The non-transitory machine-readable medium of claim 1, wherein the determining a physical downlink shared channel scheduling resource using at least a rate matching pattern.

14. A method to determine a physical downlink shared channel scheduling resource for a user equipment device and a base station, the method comprising:
grouping a plurality of component carriers from a pool of available component carriers associated with a wireless link established between the user equipment device and the base station into a plurality of groups of component carriers, wherein at least one of the plurality of component carriers is included in two of the plurality of groups of component carriers;
selecting a group of component carriers among the plurality of groups of component carriers;
forming a virtual component carrier from the selected group of the component carriers; and
determining a physical downlink shared channel scheduling resource based on at least the virtual component carrier.

15. The method of claim 14, wherein the pool of available component carriers includes at least one component carrier from a licensed band and at least one component carrier from an unlicensed band.

16. The method of claim 14, wherein each group of the plurality of groups of component carriers comprises a scheduling component carrier.

17. The method of claim 14, wherein the forming of the virtual component carrier comprises: aggregating bandwidth of the plurality of component carriers.

18. A user equipment device comprising: at least one antenna;
at least one radio, wherein the at least one radio is to perform cellular communications using a radio access technology that establishes a wireless link with a base station; and
one or more processors to perform operations comprising:
grouping a plurality of component carriers from a pool of available component carriers associated with a wireless link established between the user equipment device and the base station into a plurality of groups of component carriers, wherein at least one of the plurality of component carriers is included in two of the plurality of groups of component carriers,
selecting a group of component carriers among the plurality of groups of component carriers,
forming a virtual component carrier from the selected group of the component carriers, and
determining a physical downlink shared channel scheduling resource based on at least the virtual component carrier.

19. The user equipment device of claim 18, wherein the pool of available component carriers includes at least one component carrier from a licensed band and at least one component carrier from an unlicensed band.

20. The user equipment device of claim 18, wherein each group of the plurality of groups of component carriers comprises a scheduling component carrier.

* * * * *